(12) United States Patent
Liu

(10) Patent No.: US 11,655,195 B1
(45) Date of Patent: May 23, 2023

(54) TREATMENT METHOD FOR IMPROVING HERBAGE SEED YIELD

(71) Applicant: Lanzhou University, Lanzhou (CN)

(72) Inventor: Quan Liu, Lanzhou (CN)

(73) Assignee: LANZHOU UNIVERSITY, Lanzhou (CN)

( * ) Notice: Subject to any disclaimer, the term of this patent is extended or adjusted under 35 U.S.C. 154(b) by 0 days.

(21) Appl. No.: 17/970,766

(22) Filed: Oct. 21, 2022

(51) Int. Cl.
| | |
|---|---|
| *C05F 11/10* | (2006.01) |
| *A01C 23/04* | (2006.01) |
| *C05G 5/23* | (2020.01) |
| *C05D 9/02* | (2006.01) |
| *C05F 11/00* | (2006.01) |

(52) U.S. Cl.
CPC ............ *C05F 11/00* (2013.01); *A01C 23/047* (2013.01); *C05D 9/02* (2013.01); *C05F 11/10* (2013.01); *C05G 5/23* (2020.02)

(58) Field of Classification Search
None
See application file for complete search history.

(56) References Cited

FOREIGN PATENT DOCUMENTS

| CN | 104151000 A | * | 11/2014 |
|---|---|---|---|
| CN | 109734516 A | | 5/2019 |
| CN | 109942329 A | * | 6/2019 |
| CN | 110036840 A | | 7/2019 |
| CN | 111471081 A | | 7/2020 |
| CN | 111732488 A | * | 10/2020 |

OTHER PUBLICATIONS

Chen Mojun, Chinese Forage Plants, pp. 1334-1335, Jan. 2002.
CNIPA, Notification of a First Office Action for CN202111526798.X, dated Jun. 17, 2022.
Lanzhou University (Applicant), Reply to Notification of a First Office Action for CN202111526798.X, w/ replacement claims, dated Jul. 27, 2022.
Lanzhou University (Applicant), Supplemental Reply to Notification of a First Office Action for CN202111526798.X, w/(allowed)replacement claims, dated Aug. 4, 2022.
CNIPA, Notification to grant patent right for invention in CN202111526798.X, dated Aug. 18, 2022.

* cited by examiner

*Primary Examiner* — Wayne A Langel
(74) *Attorney, Agent, or Firm* — Zhigang Ma

(57) ABSTRACT

A prepared method of arginine chelated selenium foliar fertilizer which is benefit for improving herbage seed yield is provided. The prepared foliar fertilizer is conducive to significantly promote the yields of herbage and seeds. The weight and diameter of the seeds and the contents of fat, polysaccharide, isoflavone and selenium contained in the herbage seeds have increased obviously. Seed is the chip of agriculture. High yield and quality of herbage seeds provide a good basis for forage production, which not only develops livestock industry, but also plays an important role in protecting ecological environment.

6 Claims, No Drawings

TREATMENT METHOD FOR IMPROVING HERBAGE SEED YIELD

TECHNICAL FIELD

The disclosure relates to technical fields of agricultural cultivation and seed production, and more particularly to a treatment method for improving herbage seed yield.

BACKGROUND

Herbage generally refers to grass or other herbs, which is used for feeding livestock. Herbage is the first choice for raising livestock because of strong regenerative power, multiple harvests per year, and containing various trace elements and vitamins.

Herbage seed production is the basis for producing herbage, which is not only used to develop livestock industry, but also plays an important role in protecting ecological environmental and constructing a life community of mountains, rivers, forests, fields, lakes and grasses.

Selenium is one of essential trace elements for organisms. Studies have shown that exogenous selenium treatment could improve crop growth. For example, spraying sodium selenite on leaves can improve strawberry shape, increase content of soluble sugar, increase ratio of sugar to acid, and improve content of vitamin C contained in the fruit. Spraying selenium fertilizer can grow crops and meet an acquirement that human body cannot absorb selenium directly and need to take in selenium from food indirectly to supplement selenium.

However, there are relatively few studies in the related art on effects of selenium on herbage, especially herbage seed production.

SUMMARY

An object of the disclosure is to provide prepared and treatment method for improving herbage seed yield. Spraying arginine chelated selenium foliar fertilizer during herbage growth period can not only improve herbage seed yield, but also improve herbage seed quality, which provides a solid basis for herbage production and livestock industry development.

In order to achieve the above objects, the disclosure provides technical solutions.

A treatment method for improving herbage seed yield, including spraying arginine chelated selenium foliar selenium fertilizer during herbage growth period.

In an illustrated embodiment of the disclosure, the herbage growth period is blooming period or growing period.

A structural formula of the arginine of the disclosure is shown as follows:

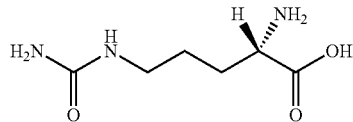 [SMILES: NC(=O)NCCC[C@H](N)C(=O)O]

The arginine is a biosynthetic precursor of important substances such as polyamines (PA) and nitric oxide (NO) in herbage. However, PA and NO are both important messenger molecules in herbage, which are involved in almost all physiological and biochemical processes including growth, stress resistance, etc. The arginine is also a kind of amino acids with high nitrogen-to-carbon (N/C) ratio. In addition, the arginine can combine with a few carbon atoms to produce more nitrogen, as a main form of nitrogen compounds in herbage seeds for storage, transportation and reuse. The disclosure takes advantages of spraying arginine chelated selenium foliar fertilizer as a treatment method to improve herbage seed yield, which can improve not only herbage seed yield, but also further seed quality.

When traditional selenium fertilizer is absorbed by herbage, it often needs to be transformed by enzymes first, and then transported through a sulfur channel of herbage, which is less efficient. The arginine chelated selenium prepared by the disclosure is relatively similar to the structure of plant enzymes in herbage because of high nitrogen, and is directly transferred through the enzyme channel after being absorbed by the herbage, which greatly improves transfer rate of selenium in herbage, and the yield and quality of herbage as well as herbage seeds. Meanwhile, foliar spraying method adopted by the disclosure can avoid a reduction of fertilizer effect of selenium fertilizer caused by soil hydrogen ion concentration (pH), which is more beneficial to the fertilizer effect of selenium fertilizer.

In an illustrated embodiment of the disclosure, a content of selenium in the arginine chelated selenium foliar fertilizer is 40 parts per million (ppm).

In an illustrated embodiment of the disclosure, preparing the arginine chelated selenium foliar fertilizer includes: dissolving arginine in water; adding soluble selenium salt to perform a chelation reaction under a pressure to obtain arginine chelated selenium solution; diluting the arginine chelated selenium solution with water to obtain the arginine chelated selenium foliar selenium fertilizer.

In an illustrated embodiment of the disclosure, the soluble selenium salt is sodium selenite, or sodium selenate, or sodium selenite and sodium selenate.

In an illustrated embodiment of the disclosure, a molar ratio of the arginine: the soluble selenium salt is 2~3:1.

In an illustrated embodiment of the disclosure, a mass-volume ratio of the arginine: the water is 1 gram (g):15 milliliters (mL)~20 mL.

In an illustrated embodiment of the disclosure, the pressure is between 0.3 mega Pascal (MPa) and 0.5 MPa.

In an illustrated embodiment of the disclosure, a temperature of the chelation reaction is between 110 degree Celsius (° C.) and 120° C., and a time of the chelation reaction is between 30 min and 40 min.

The disclosure breaks a limitation of the temperature of the chelation reaction in water system by increasing the pressure in the chelation reaction, which makes activity of the selenium and amino acid greatly improved, makes chelation efficiency and chelation rate improved and effectively enhances fertilization efficiency of the arginine chelated selenium foliar fertilizer.

The advantages of the disclosure are as follows.

The disclosure improves yield and quality of the herbage and herbage seeds by spraying the arginine chelated selenium foliar fertilizer during herbage growth period.

It can be seen from experimental data of the disclosure that herbage yield, weight and diameter of herbage seeds and contents of fat, polysaccharide, isoflavone and selenium contained in the herbage seeds significantly increase in the treatment of applying the arginine chelated selenium foliar fertilizer prepared by the disclosure.

DETAILED DESCRIPTION OF EMBODIMENTS

Various illustrated embodiments of the disclosure are now described in detail. The detailed descriptions are not a limitation of the disclosure but should be understood as a more detailed description of certain aspects, features, and embodiments of the disclosure. Terms described in the disclosure are only intended to describe illustrated embodiments but not intended to limit the disclosure.

In addition, for a range of values in the disclosure, each intermediate value between an upper limit and a lower limit of the range is also specifically disclosed. Intermediate values within any described value or described range, as well as any other described value or each smaller range of the intermediate values within the described range are also included in the disclosure. The upper and lower limits of the smaller ranges can be independently included or excluded from the range.

Unless otherwise described, all technical and scientific terms used herein have same meanings as those commonly understood by those skilled in the art. Although the disclosure only describes illustrated methods and materials, any other methods, and materials similar or equivalent to those described herein can be used in the implementation or testing of the disclosure.

As used herein, terms "contain", "include", "comprise", "compose" etc. represent a wide range, namely that the terms mean to include but not to limit.

Embodiment 1

Preparing the arginine chelated selenium includes:
mixing arginine with water at a ratio of the arginine: the water being 1 gram (g):20 milliliter (mL) to obtain a solution; adding sodium selenite according to ½ of a molar amount of the arginine to the solution; transferring the solution to a pressure reactor after that solids dissolve fully; setting reaction pressure between 0.3 mega Pascal (MPa) and 0.5 MPa, reaction temperature between 110 degree Celsius (° C.) and 120° C. and reaction time for 35 min; diluting the solution with water after cooling down until that a content of selenium is 40 parts per million (ppm); thereby obtaining the arginine chelated selenium.

Embodiment 2

Preparing the arginine chelated selenium includes:
mixing arginine with water at a ratio of the arginine: the water being 1 g:18 mL to obtain a solution; adding sodium selenate according to ½ of a molar amount of the arginine to the solution; transferring the solution into a pressure reactor after that solids dissolve fully; setting reaction pressure between 0.3 MPa and 0.5 MPa, reaction temperature between 110° C. and 120° C. and reaction time for 30 min; diluting the solution with water after cooling down until that a content of selenium is 40 ppm; thereby obtaining the arginine chelated selenium.

Embodiment 3

Preparing the arginine chelated selenium includes:
mixing arginine with water at a ratio of the arginine: the water being 1 g:15 mL to obtain a solution; adding sodium selenite according to ⅓ of a molar amount of the arginine to the solution; transferring the solution into a pressure reactor after that solids dissolve fully; setting reaction pressure between 0.3MPa and 0.5 MPa, reaction temperature between 110° C. and 120° C. and reaction time for 38 min; diluting the solution with water after cooling down until that a content of selenium is 40 ppm; thereby obtaining the arginine chelated selenium.

Embodiment 4

Preparing the arginine chelated selenium includes:
mixing arginine with water at a ratio of the arginine: the water being 1 g:16 mL to obtain a solution; adding sodium selenate according to ⅓ of a molar amount of the arginine to the solution; transferring the solution to a pressure reactor after that solids dissolve fully; setting reaction pressure between 0.3 MPa and 0.5 MPa, reaction temperature between 110° C. and 120° C. and reaction time for 40 min; diluting the solution with water after cooling down until that a content of selenium is 40 ppm; thereby obtaining the arginine chelated selenium.

Contrast Example 1

Preparing arginine chelated selenium includes:
Compared with the embodiment 1, setting reaction pressure at an atmospheric pressure, reaction temperature at 100° C. and reaction time for 2 hours; other conditions being the same as the embodiment 1.

Contrast Example 2

Preparing histidine chelated selenium includes:
Compared with the embodiment 1, replacing arginine with histidine of equal molar amount under the same other conditions as in the embodiment 1.

Test Example 1

Selenium chelation rate of the arginine chelated selenium made in the embodiment 1 of the disclosure is compared with that of the contrast example 1.

The selenium chelation rate of the arginine chelated selenium is calculated as follows:
Extracting 0.1 g (accurate to 0.0001 g) freeze-drying sample of the arginine chelated selenium dried to constant weight; placing the sample in a 250 mL iodine flask; adding 100 mL water to dissolve the sample to obtain a solution; adding 2 g potassium iodide, 10 mL trichloromethane and 5 mL hydrochloric acid solution (1 mol/L) to the solution and shaking the solution well; placing the iodine flask in a dark place for 5 min; titrating the solution with sodium thiosulfate titrant; adding 2 mL starch indicator near an end point (referred to the solution changing from red brown to yellow); shaking the iodine flask strongly for 1 min and continuing titration until blue color disappears; making a blank test at the same time; and calculating a content of inorganic selenium in the sample ($X_1$, %). The calculation formula is shown as follows.

$$X_1 = \frac{(v_1 - v_2) \times c \times 0.01974}{m_1} \times 100\% \quad (1)$$

In the formula (1), c represents a concentration of sodium thiosulfate titrant, mol/L; $V_1$ represents a volume of sodium thiosulfate titrant consumed by the sample, mL; $V_2$ represents a volume of sodium thiosulfate titrant consumed in the blank test, mL; $M_1$ represents a mass of the sample, g.

Extracting 0.8 g (accurate to 0.0001 g) freeze-drying sample of the arginine chelated selenium dried to constant weight; placing the sample in a 250 mL breaker; adding 10 mL water and 10 mL concentrated nitric acid into the sample to obtain a solution; adding a watch glass and placing on a hot plate to heat at a low temperature until the reaction starts (referred to foam starting to be generated); boiling slowly until that a volume of the solution decreases to 5 mL; cooling down and adding 5 mL perchloric acid to the solution, then continuing heating until that bubbles vanish and the perchloric acid starts to smoke; cooling down and washing the breaker with water; evaporating the water at a low temperature and raising until the perchloric acid smokes again for 5~10 min; washing the breaker and transferring the solution into a 250 mL iodine flask; adding water to dilute the solution to 100 mL; adding 2 g potassium iodide, 10 mL trichloromethane and 5 mL hydrochloric acid solution (1 mol/L) to the solution and shaking the solution well; placing the breaker in a dark place for 5 min; titrating the solution with sodium thiosulfate titrant; adding 2 mL starch indicator near an end point (referred to the solution changing from red brown to yellow); shaking the breaker strongly for 1min and continuing titration until blue color disappears; making a blank test at the same time; and calculating a content of total selenium in the sample ($X_2$, %). The calculation formula is shown as follows:

$$X_2 = \frac{(v_3 - v_4) \times c \times 0.01974}{m_2} \times 100\% \quad (2)$$

In the formula (2), c represents a concentration of sodium thiosulfate titrant, mol/L; $V_3$ represents a volume of sodium thiosulfate titrant consumed by the sample, mL; $V_4$ represents a volume of sodium thiosulfate titrant consumed in the blank test, mL; $M_2$ represents a mass of the sample, g.

Selenium chelation rate of amino acid chelated selenium (%)=(the content of total selenium−the content of inorganic selenium)/the content of total selenium=$(X_2-X_1)/X_2 \times 100\%$.

Through the above detection, the selenium chelation rate of the arginine chelated selenium prepared in the Embodiment 1 is 93.5%, and the selenium chelation rate of the arginine chelated selenium prepared in the Contrast example 1 is 82.6%, which proves that chelation conditions used in the disclosure perform more excellent than traditional hydrothermal chelation.

Test Example 2

Effects of the amino acid chelated selenium prepared by the disclosure are verified.

Spraying the amino acid chelated selenium foliar fertilizer prepared by the embodiment 1 and the contrast example 1 and 2 respectively twice to leaves of red clover during a blooming period. Spray interval is ten days (the first on June 30 and the twice on July 10). The breeds of the red clover are Mount Min and Canada. The leaves are soaked but there is no liquid drip. At the same time, the control group is set (the fertilizer sprayed in the control group is a mixture solution of arginine and sodium selenite with a same concentration as that in the Embodiment 1). After 40 days (July 30), red clover seeds are collected and tested. The results of growth and physiological indicators are shown in Table 1 to 7.

TABLE 1 the seed setting rates of red clover in each treatment group (%).

| Breed | Embodiment 1 | Contrast example 1 | Contrast example 2 | Control group |
|---|---|---|---|---|
| Mount Min | 63.81 ± 3.42 | 61.32 ± 1.54 | 61.05 ± 3.02 | 58.65 ± 4.07 |
| Canada | 63.36 ± 2.73 | 62.63 ± 2.04 | 62.35 ± 1.88 | 54.64 ± 1.51 |

TABLE 2 the thousand kernel weights of red clover seeds in each treatment group (g).

| Breed | Embodiment 1 | Contrast example 1 | Contrast example 2 | Control group |
|---|---|---|---|---|
| Mount Min | 1.79 ± 0.01 | 1.69 ± 0.02 | 1.60 ± 0.01 | 1.47 ± 0.01 |
| Canada | 1.86 ± 0.01 | 1.71 ± 0.03 | 1.82 ± 0.03 | 1.66 ± 0.02 |

TABLE 3 the diameters of red clover seeds in each treatment group (mm).

| Breed | Embodiment 1 | Contrast example 1 | Contrast example 2 | Control group |
|---|---|---|---|---|
| Mount Min | 2.00 ± 0.02 | 1.93 ± 0.02 | 1.95 ± 0.01 | 1.83 ± 0.02 |
| Canada | 1.99 ± 0.03 | 1.97 ± 0.01 | 1.95 ± 0.03 | 1.89 ± 0.02 |

TABLE 4 the contents of fat contained in red clover seeds in each treatment group (%).

| Breed | Embodiment 1 | Contrast example 1 | Contrast example 2 | Control group |
|---|---|---|---|---|
| Mount Min | 8.37 ± 0.26 | 8.26 ± 0.18 | 8.32 ± 0.22 | 8.11 ± 0.32 |
| Canada | 8.24 ± 0.46 | 8.09 ± 0.32 | 8.20 ± 0.12 | 8.14 ± 0.21 |

TABLE 5 the contents of polysaccharide contained in red clover seeds in each treatment group (%).

| Breed | Embodiment 1 | Contrast example 1 | Contrast example 2 | Control group |
|---|---|---|---|---|
| Mount Min | 4.90 ± 0.30 | 4.68 ± 0.46 | 4.75 ± 0.27 | 4.88 ± 0.19 |
| Canada | 4.57 ± 0.31 | 4.36 ± 0.33 | 4.38 ± 0.15 | 4.48 ± 0.28 |

TABLE 6 the contents of isoflavone contained in red clover seeds in each treatment group (mg/g).

| Breed | Embodiment 1 | Contrast example 1 | Contrast example 2 | Control group |
|---|---|---|---|---|
| Mount Min | 5.27 ± 0.07 | 5.18 ± 0.53 | 5.14 ± 0.36 | 5.04 ± 0.33 |
| Canada | 5.33 ± 0.12 | 5.24 ± 0.29 | 5.28 ± 0.28 | 4.93 ± 0.12 |

TABLE 7 the contents of selenium contained in red clover seeds in each treatment group (ppm).

| Breed | Embodiment 1 | Contrast example 1 | Contrast example 2 | Control group |
|---|---|---|---|---|
| Mount Min | 0.18 ± 0.13 | 0.15 ± 0.08 | 0.13 ± 0.05 | 0.14 ± 0.10 |
| Canada | 0.16 ± 0.08 | 0.14 ± 0.04 | 0.15 ± 0.09 | 0.15 ± 0.07 |

As shown in tables 1 to 7, the application of arginine chelated selenium prepared by the disclosure (Embodiment 1), relative to arginine chelated selenium with lower chelation rate (Contrast example 1) and Control group, the histidine chelated selenium with lower nitrogen (N) content (Contrast example 2), the seed setting rate of herbage, the weight and diameter of herbage seeds, and the content of fat, polysaccharide, isoflavone and selenium contained in herbage seeds have been significantly improved.

The embodiments described above are only illustrated embodiments of the disclosure, but not to limit the protection scope of the disclosure. Without departing from the spirit of the design of the disclosure, any deformation and improvement made to the technical solutions of the disclosure by those skilled in the field shall be included in the protection scope of the disclosure.

What is claimed is:

1. A treatment method for improving herbage seed yield, comprising:
spraying arginine chelated selenium foliar fertilizer during herbage growth period, the herbage growth period being one of blooming period and growing period, wherein preparing the arginine chelated selenium foliar fertilizer comprises:
dissolving arginine in water to obtain dissolved solution; wherein a mass-volume ratio of the arginine: the water is 1 g:15 mL~20 mL;
adding soluble selenium salt into the dissolved solution to perform a chelation reaction under a pressure to obtain arginine chelated selenium solution; wherein a temperature of the chelation reaction is between 110° C. and 120° C., a time of the chelation reaction is between 30 min and 40 min, and the pressure is between 0.3 MPa and 0.5 MPa;
diluting the arginine chelated selenium solution with water to obtain the arginine chelated selenium foliar fertilizer;
wherein the soluble selenium salt is at least one selected from a group consisting of sodium selenite and sodium selenate; and
wherein a molar ratio of the arginine: the soluble selenium salt is 2~3:1.

2. The method according to claim 1, wherein the adding soluble selenium salt into the dissolved solution to perform a chelation reaction under a pressure to obtain arginine chelated selenium solution, comprises:
dissolving the soluble selenium salt in the dissolved solution, and then transferring the dissolved solution to a pressure reactor for performing the chelation reaction under the pressure, and thereby obtaining the arginine chelated selenium solution.

3. The method according to claim 2, wherein the diluting the arginine chelated selenium solution with water to obtain the arginine chelated selenium foliar fertilizer, comprises:
diluting the arginine chelated selenium solution with the water after cooling down until that a content of selenium is 40 ppm, thereby obtaining the arginine chelated selenium foliar fertilizer.

4. The method according to claim 1, wherein a content of selenium in the arginine chelated selenium foliar fertilizer is 40 parts per million (ppm).

5. A treatment method for improving herbage seed yield, comprising:
spraying arginine chelated selenium foliar fertilizer during herbage growth period, wherein preparing the arginine chelated selenium foliar fertilizer comprises:
dissolving arginine in water to obtain dissolved solution; wherein a mass-volume ratio of the arginine: the water is 1 g :15 mL~20 mL;
dissolving soluble selenium salt in the dissolved solution, and then transferring the dissolved solution to a pressure reactor to perform a chelation reaction under a pressure between 0.3 MPa and 0.5 MPa, and thereby obtaining arginine chelated selenium solution; wherein a molar ratio of the arginine: the soluble selenium salt is 2~3:1, a temperature of the chelation reaction is between 110° C. and 120° C., and a time of the chelation reaction is between 30 min and 40 min; and
diluting the arginine chelated selenium solution with the water after cooling down until that a content of selenium is 40 ppm, thereby obtaining the arginine chelated selenium foliar fertilizer;
wherein the soluble selenium salt is at least one selected from a group consisting of sodium selenite and sodium selenate.

6. The method according to claim 5, wherein the herbage growth period is one of blooming period and growing period.

* * * * *